(12) United States Patent
Vaikar

(10) Patent No.: US 11,102,171 B2
(45) Date of Patent: Aug. 24, 2021

(54) VIRTUAL DISTRIBUTED DOMAIN NAME SERVER

(71) Applicant: VMWARE, INC., Palo Alto, CA (US)

(72) Inventor: Amol Manohar Vaikar, Pune (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/864,012

(22) Filed: Jan. 8, 2018

(65) Prior Publication Data

US 2019/0158459 A1 May 23, 2019

(30) Foreign Application Priority Data

Nov. 21, 2017 (IN) .............................. 201741041673

(51) Int. Cl.
*H04L 29/12* (2006.01)
*G06F 9/455* (2018.01)
*H04L 29/08* (2006.01)

(52) U.S. Cl.
CPC ...... *H04L 61/6009* (2013.01); *G06F 9/45533* (2013.01); *G06F 9/45558* (2013.01); *H04L 61/1511* (2013.01); *H04L 61/1552* (2013.01); *H04L 67/02* (2013.01)

(58) Field of Classification Search
CPC ............. H04L 61/6009; H04L 61/1552; H04L 61/1511; H04L 67/02; G06F 9/45558
See application file for complete search history.

(56) References Cited

U.S. PATENT DOCUMENTS

| 9,426,171 | B1* | 8/2016 | Jezorek | H04L 63/1433 |
| 10,015,094 | B1* | 7/2018 | Akers | H04L 61/6068 |
| 2001/0049741 | A1* | 12/2001 | Skene | G06F 9/505 709/232 |
| 2004/0215665 | A1* | 10/2004 | Edgar | H04L 63/08 |
| 2010/0268764 | A1* | 10/2010 | Wee | G06F 9/505 709/203 |
| 2014/0082172 | A1* | 3/2014 | Chueh | H04L 61/1511 709/223 |
| 2019/0007366 | A1* | 1/2019 | Voegele | H04L 12/4633 |

OTHER PUBLICATIONS

P. Mockapetris, Network Working Group entitled "Domain Names—Implementation and Specification" dated Nov. 1987 (55 pages).

* cited by examiner

*Primary Examiner* — Joe Chacko

(57) ABSTRACT

An approach for intercepting and caching Domain Name System (DNS) related data and sharing the cached DNS related data among hypervisors is provided. In an embodiment, a method comprises: receiving a DNS query from a virtual machine, determining whether a DNS reply to the DNS query has been received from a DNS server and whether an Internet Protocol (IP) address has been stored in a local DNS cache; in response to determining that tire DNS reply to the DNS query has been received from the DNS server and the IP address has been stored in the local DNS cache; retrieving the IP address from the local DNS cache; and providing the IP address to the virtual machine.

20 Claims, 5 Drawing Sheets

VIRTUAL DISTRIBUTED DOMAIN NAME SERVER

RELATED APPLICATIONS

Benefit is claimed under 35 U.S.C. 119(a)-(d) to Foreign Application Serial No. 201741041673 filed in India entitled "VIRTUAL DISTRIBUTED DOMAIN NAME SERVER", on Nov. 21, 2017, by VMware, Inc., which is herein incorporated in its entirety by reference for all purposes.

BACKGROUND

The Domain Name System (DNS) protocol is used to translate domain names of computer devices and services to numerical IP addresses. To resolve the IP addresses, the DNS relies on DNS queries and DNS replies. Typical DNS queries and replies are usually small in size; the queries are restricted to 512 bytes, and the replies are restricted to 100-150 bytes. However, since a typical computer device may transmit thousands of DNS queries per day, and a computer network may have thousands of devices, data traffic generated by the DNS queries and replies may place considerable demands on the network bandwidth.

Demand on the bandwidth may increase even more if a computer network is large but maintains only few DNS servers. In such a network, the DNS queries may be transmitted by many routers and switches before the queries reach a DNS server, and the DNS replies may be transmitted by many routers and switches before the replies reach the requestors. Transmitting the queries and replies by hundreds of routers and switches may significantly congest the data traffic in the network.

It appears that it may be difficult to solve the problem using the functionalities of computer operating systems. This is because the operating systems may not be configured to perform a DNS caching, furthermore, the operating system may not be configured to share the DNS-related data with other computers to speed up the DNS lookups.

SUMMARY

A virtualization solution that is configured to secretly intercept DNS queries and replies, cache DNS-related data, and share the cached data among VMs and other hypervisors is presented herein. The solution is implemented in a virtual distributed domain name server (D-DNS). A D-DNS may be deployed in a kernel component of a hypervisor. Each hypervisor in a computer network may implement a D-DNS.

In an embodiment, a hypervisor is configured to intercept DNS queries and DNS responses. A D-DNS that is implemented in the hypervisor may cache the intercepted communications, and use the cached communications stored in the cache to resolve IP addresses. For example, if a DNS reply to a DNS query is received from a DNS server, the hypervisor may intercept the reply, and the D-DNS may extract a domain name and an IP address from the reply, create an association between the domain name and the resolved IP address, and store the association in the local DNS cache and also forward the response to the virtual machine that made the request. Once one or more DNS queries with the particular domain name are received, the DNS queries do not have to be forwarded to the DNS server because the resolved IP address is already stored in the local DNS cache, and the resolved IP address may be provided from the local DNS cache.

The hypervisor may transmit, via unicast and/or multicast communications, the association to other hypervisors in a datacenter. Upon receiving the association from the hypervisor, other hypervisors may update their local DNS caches and use the content of the association to answer DNS queries that include a domain name that matches the domain name included in the association. The hypervisors do not have to forward such DNS queries to a DNS server because the resolved IP address is already stored in their local DNS caches. The local DNS caches may store hundreds of associations, and thus allow resolving IP addresses quickly and efficiently.

In an embodiment, instead of transmitting the association directly to other hypervisors, the hypervisor transmits the association to a DNS cache synchronization controller that is implemented in a datacenter. The DNS cache synchronization controller may be configured to identify other hosts and hypervisors in the center, and may forward the association to other hypervisors. If the hypervisors are co-located, then the association may be transmitted from the datacenter to the hypervisors via collocated switches and routers. Otherwise, the association may be transmitted to the hypervisors via the switches, routers and a core router.

When a host in the datacenter receives another DNS query from a virtual machine hosted by the host, a D-DNS implemented in a hypervisor of the host may parse the received DNS query, extract a domain name from the query, and test whether the extracted domain name has been already included in a local DNS cache. If the extracted domain name has been already included in the local DNS cache, then the D-DNS may test whether an IP address has been resolved for the domain name. If the IP address has been already resolved for the domain name, and the resolved IP address has been already stored in the local DNS cache, then the D-DNS may retrieve the resolved IP address from its local DNS cache, and return the resolved IP address to the virtual machine. The hypervisor does not have to forward the DNS query to a DNS server because the resolved IP address is already stored in the local DNS cache.

However, if an IP address has not been resolved for the domain name, then the hypervisor forwards the DNS query to the DNS server, and awaits a DNS reply. Upon receiving the DNS reply to the DNS query, the D-DNS parses the DNS reply, extracts a domain name and a resolved IP address from the reply, and stores the domain name and the resolved IP address in association with the domain name in the local DNS cache. Then, the hypervisor provides the resolved IP address to the virtual machine, and distributes the association to other hypervisors.

DETAILED DESCRIPTION

In the following description, for the purposes of explanation, numerous specific details are set forth in order to provide a thorough understanding of the presently described method. It will be apparent, however, that the present approach may be practiced without these specific details. In other instances, well-known structures and devices are shown in a block diagram form to avoid unnecessarily obscuring the present approach.

Example Computer System Architecture

Figure 1:
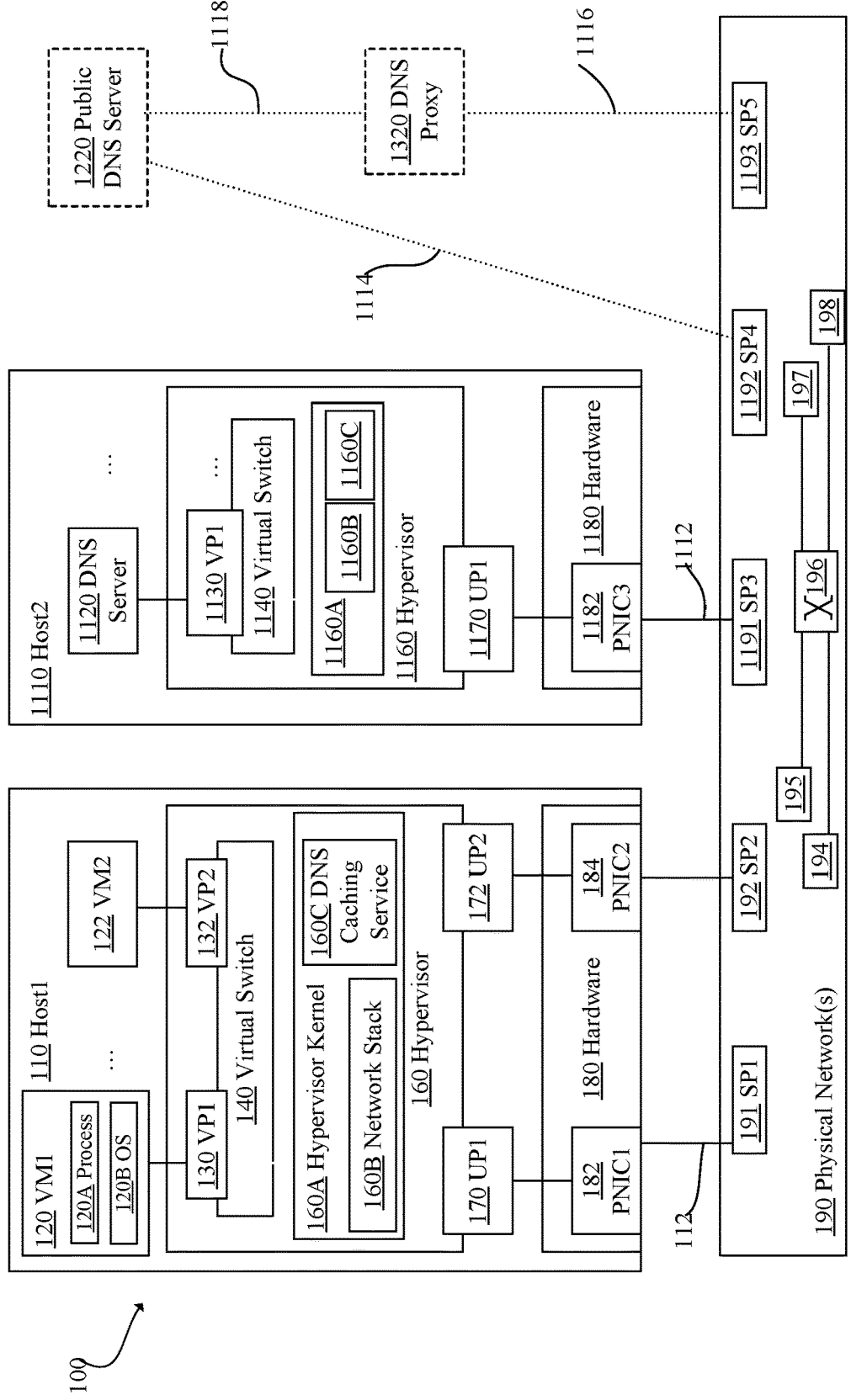
FIG. 1 is a block diagram depicting an example system architecture for a virtual distributed domain name server.

FIG. 1 is a block diagram depicting an example system architecture 100 for a virtual distributed domain name server. In the depicted example, system architecture 100 system architecture 100 that includes a VM1 120 and a VM2 122 that are implemented on a host1 110, and a DNS server 1120 that is implemented on a host2 1110. Although FIG. 1 depicts two hosts, according to other implementations, system architecture 100 may include any number of hosts, and each host may support any number of virtual machines.

In the depicted example, host1 110 hosts one or more virtual machines VM1 120, VM2 122, and a hypervisor 160. Host2 1110 hosts a DNS server 1120, and a hypervisor 160. Both hosts may host additional virtual machines not depicted in FIG. 1.

Virtual machines VM1 120, VM2 122, DNS Server 1120, and possibly additional virtual machines implemented in system 100, may be realized as complete computational environments, containing virtual equivalents of hardware and software components of the physical computing systems.

Virtual machines VM1 120, VM2 122, and DNS server 1120 may be instantiated as virtualized computing instances. The instances may be equipped with their own resources, may be assigned their own workloads, and may be configured to perform their own tasks associated with the workloads. Virtual resources allocated to the virtual machines may include virtual CPUs, virtual memory, virtual disks, virtual network interface controllers and the like. Virtual machines VM1 120, VM2 122, and DNS Server 1120 may be configured to execute guest operating systems and guest applications. VM1 120 may host for example, one or more processes 120A and an operating system 120B.

Hypervisor 160/1160 may be implemented as a software layer or a component that supports execution of multiple virtualized computing instances. Hypervisor 160/1160 may maintain respective mappings between hardware components 180, 1180 of host1 110 and host2 1110, respectively, and virtual resources allocated to the virtual machines that the hypervisors support.

Hardware components 180/1180 may include hardware processors, memory units, data storage units, and physical network interfaces, not all of which are depicted in FIG. 1. Hardware components 180/1180 may also include physical network interface controllers PNIC1 182, PNIC2 184 and PNIC3 1182 that are depicted in FIG. 1. The PNICs may provide connectivity to routers 194, 195, 197, 198, and a switch 196 of one or more physical networks 190. While the example depicted in FIG. 1 shows four routers 194, 195, 197, 198, and one switch 196, physical networks 190 may include any number of routers and switches. Furthermore, while the example depicted in FIG. 1 shows that hardware component 180 includes two PNICs 182, 184, and hardware component 1180 includes one PNIC3 1182, each hardware component may support any number of PNICs.

In an embodiment depicted in FIG. 1, PNIC1 182 and PNIC2 184 are connected to switch pons SP1 191 and SP2 192, respectively; while PNIC3 1182 is connected to a switch port SP3 1191. Data communications from hypervisor 160 may be uploaded via an uplink port UP1 170 to PNIC1 182, and/or via an uplink port UP2 172 to PNIC2 184. Data communications from hypervisor 1160 may be uploaded via an uplink port UP3 1170 to PNIC3 1190, and/or via uplink port UP4 1172 to PNIC4 1192. In other embodiments, the ports and PNICs may be configured or arranged differently than it is as depicted in FIG. 1.

Hosts 110 and 1110 may include virtual switches 140, 1140, respectively. Virtual switch 140 may be configured to detect, on a virtual port VP1 130 and a virtual port VP2 132, outgoing (egress) data packets received from VM1 120 and VM2 122, respectively. Virtual switch 140 may also be configured to determine communications paths tor routing the data packets to their destinations.

Implementations of virtual switches may vary and may depend on a type of product in which the switch is deployed as a virtualization medium. For example, a virtual switch may be implemented as a part of a hypervisor, as it is depicted in FIG. 1, and as it is usually implemented in the vSphere® and KVM® lines of products. Alternatively, although not depicted in FIG. 1, a virtual switch may be implemented as a hardware component, or as part of a user space, or as part of a space that is dedicated to a virtual machine and that is under the control of the virtual machine. Examples of such implementations include the Hyper-V® and Xen® lines of products.

DNS servers are computer servers that maintain database that store mappings between common domain names and corresponding IP addresses. The DNS servers serve to resolve, or translate, the domain names to IP addresses. For example, upon receiving, from a virtual machine client, a DNS query that includes a particular domain name, a DNS server will use the mapping to translate the particular domain name to a particular IP address, and return the particular IP address to the requestor.

As depicted in FIG. 1, a DNS server may be implemented as DNS server 1120 hosted by host2 1110. A DNS server may also be implemented as a public DNS server 1220, that can be accessed either directly via a link 1114, or via one or more DNS proxies 1320 communicating with physical networks 190 via a link 1116.

Example DNS Request Interceptor and Caching Service

Figure 2:
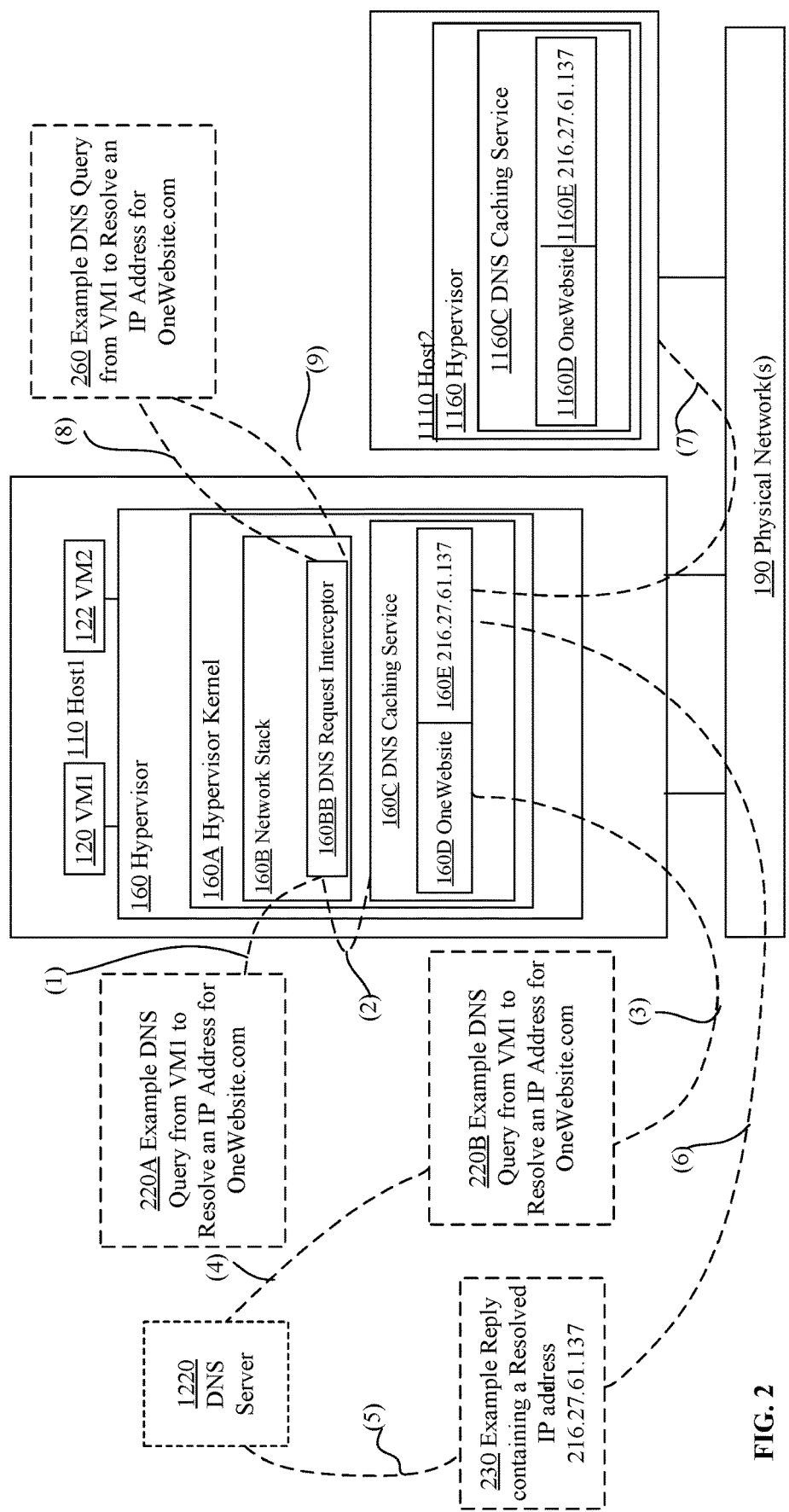
FIG. 2 is a block diagram depicting a DNS request interceptor and a DNS caching service that process DNS queries and DNS replies, and that synchronize DNS caches.

FIG. 2 is a block diagram depicting a DNS request interceptor and a DNS caching service that process DNS queries and DNS replies, and that synchronize DNS caches. In the depicted example, hypervisor 160 comprises a hypervisor kernel 160A. Hypervisor kernel 160A comprises a network slack 160B and a DNS caching service 160C. Network stack 160B hosts a DNS request interceptor 160BB.

In an embodiment, DNS request interceptor 160BB intercepts, as indicated using a line (1), a DNS query that is received by hypervisor 160. An example of a query is a query 220A sent from VM1 120 to resolve an IP address for a particular domain name called OneWebsite.com.

Once query 220A is intercepted. DNS request interceptor 160BB checks, as indicated using a line (2), whether the DNS query has been already resolved and the an IP address has been stored in DNS caching service 160C. If the particular domain name has been stored, it may be stored as a name 160D in cache of DNS caching service 160C. The cache is also referred to as a local DNS cache. However, if the particular domain name and the resolved IP address have not been stored in DNS caching service 160C, then DNS request interceptor proceed to execute a task, which is marked using a line (9) and which is described later.

The DNS query is transmitted as a DNS query 220B to a DNS server 1220. This is indicated using lines (3)-(4). DNS server 1220 may be a standalone, public DNS server, a DNS proxy, or a DNS server implemented in a virtual machine on one of the hosts of system 100 or a physical machine.

Upon receiving DNS query 220B, DNS server 1220 parses the query, extracts the particular domain name from the query, and resolves a particular IP address for the particular domain name. Then, DNS server 1220 generates, as indicated using a line (5), a DNS reply 230. DNS server 1220 includes the particular IP address in DNS reply 230, and transmits, as indicated using a line (6), DNS reply 230 to host1 110.

Upon receiving DNS reply 230, DNS caching service 160C parses DNS reply 230, extracts the particular IP address from the reply, and stores the particular IP address as an address 160E in the local DNS cache of DNS caching service 160C. The particular domain name 160D and the corresponding, resolved, particular IP address 160E may be stored as an association, or a pair. The pair forms a mapping of the particular domain name onto the resolved, particular IP address. The mapping is stored in the local DNS cache.

Furthermore, hypervisor 160 provides resolved address 160E from the local DNS cache to VM1 120 that sent DNS query 220A.

In an embodiment, once the mapping of the particular domain name 160D and the corresponding, resolved particular IP address 160E are stored in the local DNS cache of hypervisor 160, hypervisor 160 may distribute the mapping to other hypervisors that belong to the same domain or the same datacenter. For example, hypervisor 160, or hypervisor kernel 160A, may distribute, as indicated using a line (7), the mapping that includes the particular domain name 160D and the resolved particular IP address 160E to hypervisor 1160 implemented in host2 1110. The received mapping may be stored in a DNS caching service 1160C as a pair that includes fields 1160D and 1160E for storing the particular domain name and the particular, resolved IP address.

However, if hypervisor 160 receives, as indicated using a line (8), an example DNS query 260 from VM1, and DNS query 260 requests resolving an IP address for the particular domain name that has been already stored in DNS caching service 160C, then hypervisor 160 does not need to follow the path (3)-(6). Instead, hypervisor 160 may retrieve, from the local DNS cache of DNS caching service 160C, the mapping that includes the particular domain name 160D and the resolved, particular IP address 160E. Hypervisor 160 may provide, as indicated using a line (9), the resolved, particular IP address 160E to VM1.

Example Workflow for Processing DNS Queries and DNS Replies

Figure 3:
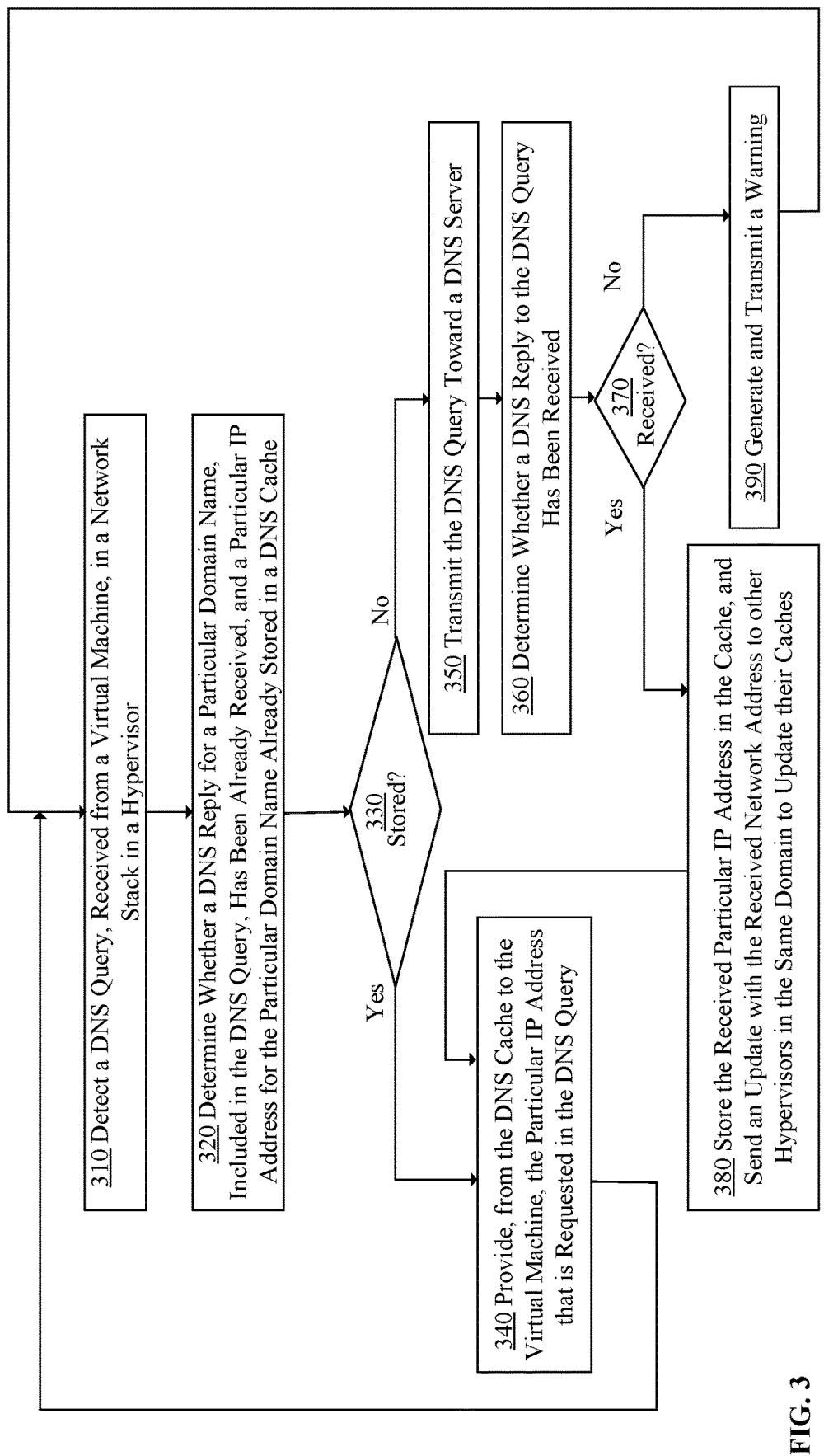
FIG. 3 is a flow chart depicting processing DNS queries and DNS replies, and synchronizing DNS caches.

FIG. 3 depicts a flow chart showing processing DNS queries and DNS replies, and synchronizing DNS caches. In step 310, a hypervisor receives a DNS query from a virtual machine, and a DNS request interceptor intercepts the DNS query. An example of a query is query 220A that is depicted in FIG. 2, that is sent from VM1 120 with a request to resolve an IP address for a particular domain name called OneWebsite.com.

In step 320, the DNS request interceptor parses the received DNS query, and extracts the particular domain name from the query. Then, the DNS request interceptor, determines whether a local DNS cache includes an entry for the particular domain name. If it does, then the DNS request interceptor checks whether an IP address has been resolved for the particular domain name and stored in the local DNS cache. This may be performed by checking whether the local DNS cache includes an entry for the particular domain, and if so, whether the entry includes a particular IP address that has been resolved for the particular domain name.

If the entry is stored in the local DNS cache and the particular IP address has been resolved for the particular domain name, then step 340 is performed. Otherwise, step 350 is performed.

In step 340, the hypervisor retrieves, from the local DNS cache of the DNS caching service, the entry that includes both the particular domain name and the resolved, particular IP address. Then, the hypervisor may transmit to the virtual machine the resolved, particular IP address to the virtual machine from the local DNS cache. It needs to be noted that the hypervisor does not transmit the DNS query, which requested resolving an IP address for the particular domain name, to a DNS server because the resolved, particular IP address has been already stored in the local DNS cache and is available for answering the DNS query. By not transmitting the DNS query to the DNS server, placing demands on the network bandwidth that would have been caused by the transmuting the query is avoided. Because the resolved, particular IP address is available in the local DNS cache, the hypervisor may answer the DNS query itself, and provide the resolved, particular IP address to the virtual machine without querying the DNS server.

However, if the hypervisor determines that the local DNS cache docs not have an entry that includes the particular domain name, or that the local DNS cache includes an entry that includes the particular domain name, but an IP address for the particular domain name has not been resolved, then step 350 is performed.

In step 350, the DNS request interceptor may check whether the particular domain name has been already stored in the DNS caching service. If it has not, then the DNS request interceptor generates an entry that includes the particular domain name, and stores the entry in the local DNS cache.

Also in this step, the hypervisor transmits the DNS query toward a DNS server. The DNS query eventually reaches the DNS server, and the DNS server resolves a particular IP address tor the particular domain name. Then, the DNS server generates a DNS reply, includes the resolved, particular IP address in the DNS reply, and sends the DNS reply to the host that hosts the hypervisor.

In step 360, the hypervisor determines whether the DNS reply to the DNS query has been received. If in step 370 it is determined that the DNS query has been received, then step 380 is performed. Otherwise, step 390 is performed.

In step 380, the DNS caching service intercepts the received DNS reply. Then, the DNS caching service parses the DNS reply, extracts the resolved, particular IP address from the reply, and stores the particular IP address in the entry for the particular domain name in the local DNS cache of the DNS caching service. At this point, the entry includes both, the particular domain name and the corresponding, resolved, particular IP address. The entry is stored in the local DNS cache, and it includes the information that was requested by the virtual machine.

Also in this step, the hypervisor transmits the entry to other hypervisors in the same domain and/or the same datacenter. The entry includes both the particular domain name and the resolved, particular IP address. Upon receiving the entry, the hypervisors store the entry in their respective caches, and use the information included in the entries to resolve DNS query that seek the resolved, particular IP address. By distributing the entry to oilier hypervisors, the hypervisors do not need to propagate their DNS queries for resolving the IP address for the particular domain name.

At this point, the hypervisor proceeds to execute step 340, in which the resolved, particular IP address is provided from the local DNS cache to the virtual machine. This step has been described above.

However, if the hypervisor has waited for a certain time period, and during that time, the hypervisor did not receive the DNS reply to the DNS query, then, in step 390, the hypervisor may generate a warning message that indicates that no DNS reply has been received to the DNS query. The warning message may be transmitted to other hypervisors and/or to a system administrator.

Synchronization of Local DNS Caches

Local DNS caches that are maintained by DNS caching services may be synchronized using a variety of methods. One of the methods includes synchronizing the caches by sending updates from hypervisors. Another method involves synchronizing the caches by sending updates from a DNS cache synchronization controller.

In an embodiment, local DNS caches implemented in hypervisors are synchronized via updates sent by a hypervisor. Once the hypervisor receives a DNS reply to a DNS query that requested resolving an IP address for a particular domain name, the hypervisor updates its own local DNS cache, and sends updates to other hypervisors. Specifically, a DNS caching service, implemented in the hypervisor, parses the DNS reply, extracts the resolved, particular IP address from the reply, and stores the particular IP address in an entry for the particular domain name in the local DNS cache of the DNS caching service. At this point, the entry includes both, the particular domain name and the corresponding, resolved, particular IP address. Then, the hypervisor transmits the entry to other hypervisors in the same domain and/or the same datacenter.

Upon receiving the entry, the hypervisors store the entry in their respective caches, and use the information included in the entry to resolve another DNS query that seeks the particular, resolved, IP address. By distributing the entry to other hypervisors, the hypervisors do not need to propagate their DNS queries for resolving the IP address for the particular domain name.

In another embodiment, two or more local DNS caches implemented in hypervisors are synchronized using updates from a DNS cache synchronization controller. An example process is depicted in FIG. 4.

Figure 4:
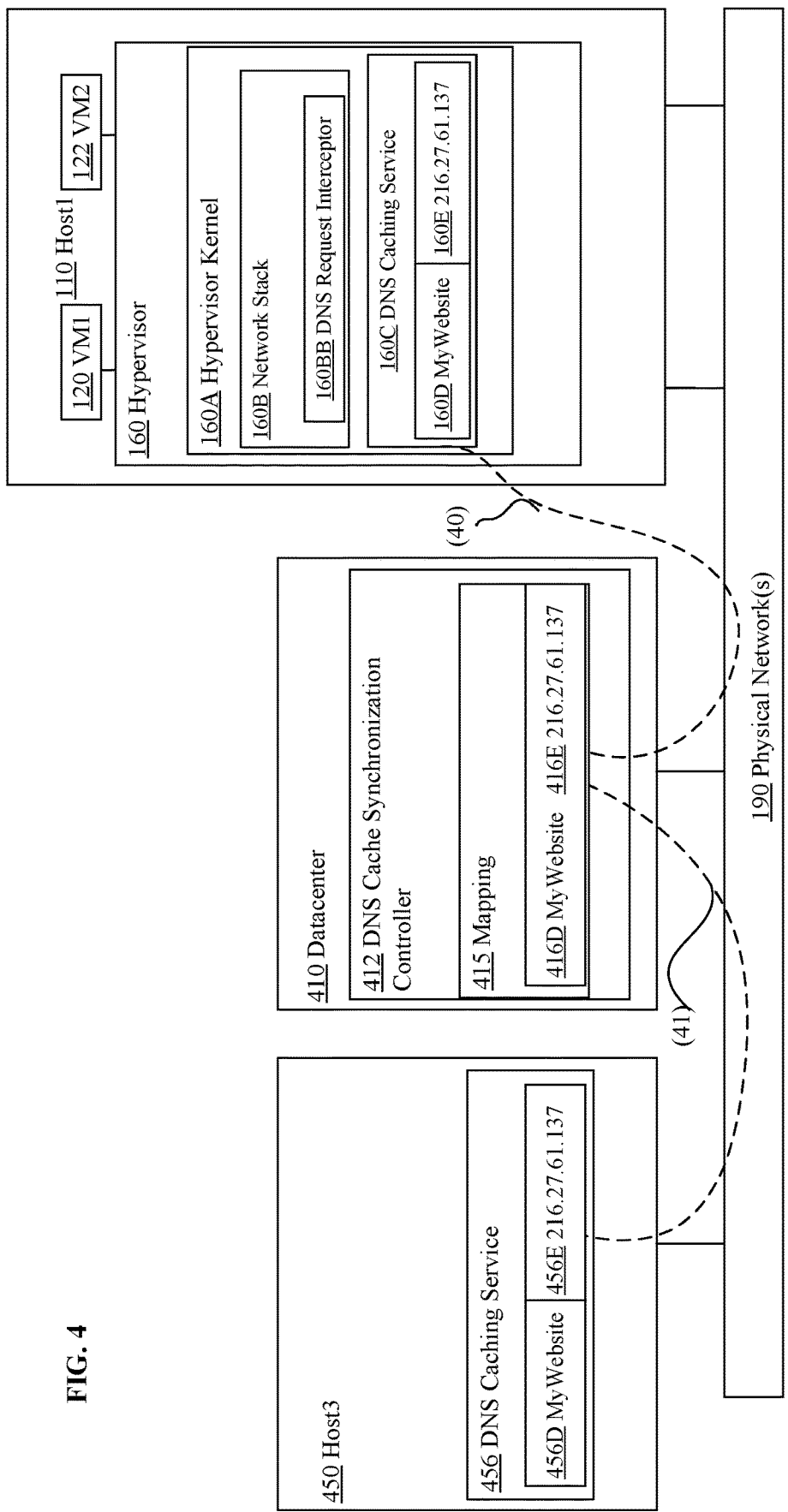
FIG. 4 is a block diagram depicting synchronizing local DNS caches by a DNS cache synchronization controller of a datacenter.

FIG. 4 is a block diagram depicting synchronizing local DNS caches by a DNS cache synchronization controller of a datacenter. In the depicted example, a datacenter 410 comprises a DNS cache synchronization controller 412. Controller 412 is configured to maintain a mapping 415 that includes a set of entries. An example entry includes a particular domain name 416D and a particular IP address 416E that has been resolved for the particular domain name.

In this approach, a hypervisor 160 receives a DNS query, and processes the DNS query as described in steps 310-330, 350-370. At this point, a DNS caching service, implemented in the hypervisor, has stored, in a local DNS cache, an entry that includes the particular domain name and the resolved, particular IP address. For example, the entry may be stored in a DNS caching service 160C, and may include a particular domain field 160D and a particular IP address field 160E.

Once the entry having the fields 160D-160E is stored in DNS caching service 160C, hypervisor 160 transmits, as indicated by a line (40), the entry to DNS cache synchronization controller 412 of datacenter 410. The entry is saved by DNS cache synchronization controller as an entry having domain name field 416D and IP address field 416E.

At this point, DNS cache synchronization controller 412 determines addresses of other hypervisors in the domain and/or the datacenter network. Upon determining one or more addresses of one or more hypervisors, DNS cache synchronization controller 412 generates one or more update messages. An update message may include an address, from the one or more addresses, and the entry which includes fields 416D and 416E. Then, DNS cache synchronization controller 412 transmits the update messages to other hypervisors. For example, DNS cache synchronization controller 412 may transmit, along a path (41), an update message to a host3 450.

Upon receiving an update message from DNS cache synchronization controller 412, DNS caching server 456 of host3 450 parses the received message and either creates, or updates its entry 456D-456E. For example, if DNS caching service 456 already had entry 456D, but did not have entry 456E, then DNS caching service 456 may using the update message to fill in entry 456E. However, if DNS caching service 456 had both entries 456D-456E, then DNS caching service 456 may use the update message to overwrite the content of entry 456E.

The above process of using the update messages may be repeated by each DNS caching service implemented in the hypervisors in the network.

Deleting Entries in Local DNS Caches

Figure 5:
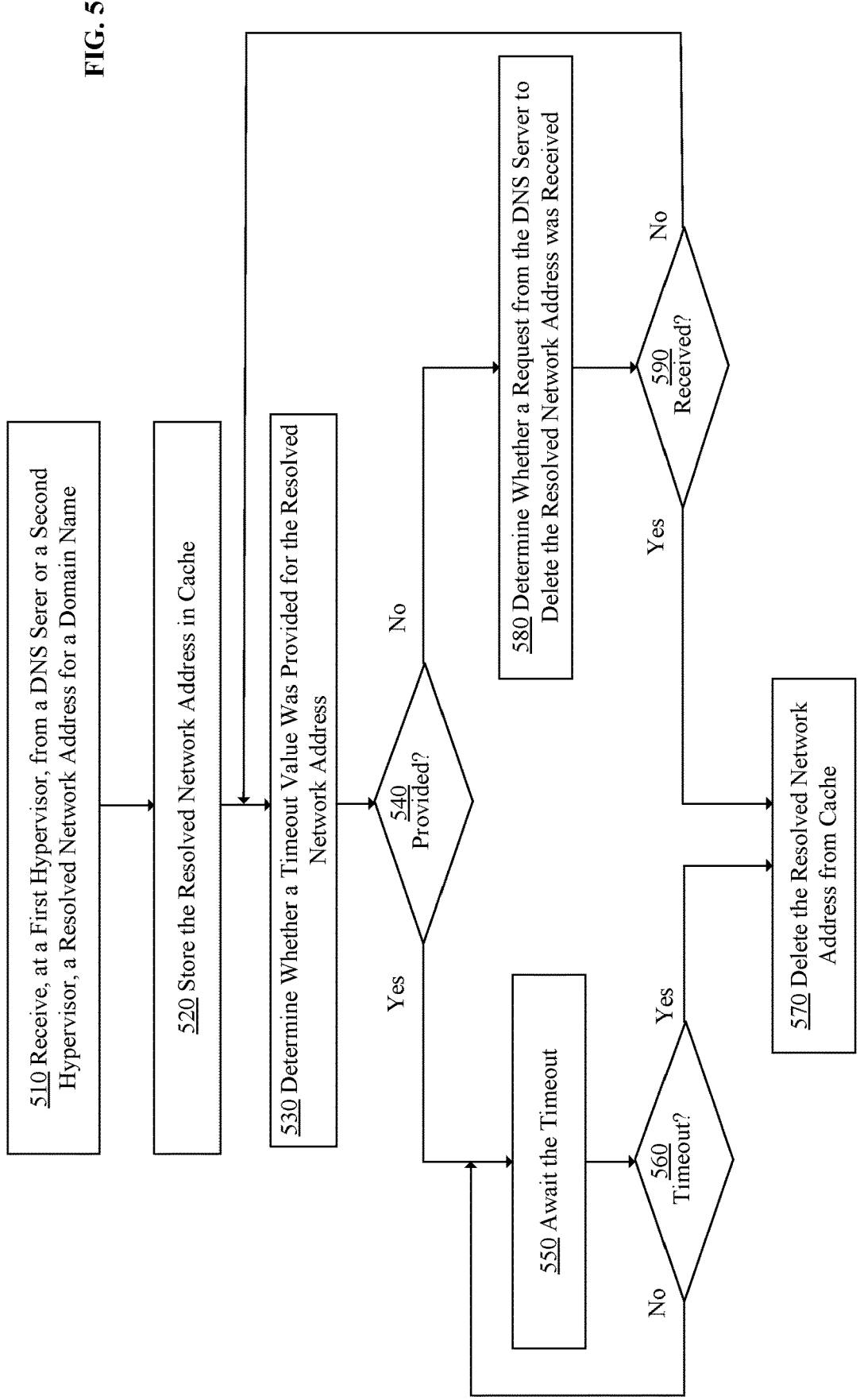
FIG. 5 is a flow chart for deleting an entry from a DNS service cache.

FIG. 5 is a flow chart for deleting an entry from a DNS service cache. In step 510, a first hypervisor receives, from a DNS server or a second hypervisor, a resolved network address for a domain name. For example, the first hypervisor may receive a DNS reply to a DNS query that sought the resolved network address for the domain name. According to another example, the first hypervisor may receive an update message from the second hypervisor, and the update message may include both the domain name and the resolved network address. According to other example, the first hypervisor may receive an update message from a DNS caching service controller, and the update message may include both the domain name and the resolved network address.

In step 520, the first hypervisor stores the received network address in its own local DNS cache. For example, a DNS caching service of the first hypervisor may access a mapping stored in the local DNS cache, determine whether an entry for the domain name has been already created, and if it has, then update the entry using the information included in the update message. However, if an entry for the domain name has not been already created, then the DNS caching service may create the entry, and fill it in with the information included in the update message.

In step 530, the first hypervisor determines whether a timeout value was provided for the resolved network address. The timeout value may be provided in the update message, or may be retrieved from a data repository available to the first hypervisor. In some situations, the timeout value may not be available.

In step 540, a test is performed to determine whether the timeout value was provided. If it has, then step 550 is performed. Otherwise, step 580 is performed.

In step 550, the first hypervisor sets a timer with the timeout value, and awaits an expiration of the timer. If the timeout value expires (step 560), then in step 570, the first hypervisor is deleting the entry with the resolved network address from the DNS caching service.

In step 580, the first hypervisor determines whether a request from the DNS server to delete the resolved network address was received. The DNS server may generate the request to delete the resolved network address because the address become obsolete, or a new network address has been assigned to the domain name.

If, in step 590, the first hypervisor received the request to delete the network address, then in step 570, the first hypervisor deletes, in step 570, the resolved network address from the local DNS cache, Otherwise, the first hypervisor performs step 530, and checks whether the timeout value is provided.

Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus, and used for storing information and software instructions to be executed by a processor. Main memory may also be used for storing temporary variables or other intermediate information during execution of software instructions to be executed by one or more processors.

General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing, from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A method for intercepting and caching Domain Name System (DNS) related data:
   receiving, by a first hypervisor that implements a local DNS cache, a DNS query from a virtual machine;
   wherein the DNS query comprises a domain name;
   wherein the first hypervisor, the local DNS cache and the virtual machine are implemented on a first host;
   determining whether an Internet Protocol (IP) address for the domain name has been stored in the local DNS cache;
   in response to determining that the IP address for the domain name has been stored in the local DNS cache, the first hypervisor performing:
     retrieving the IP address from the local DNS cache;
     providing the IP address to the virtual machine;
     generating a message and including an association between the domain name and the IP address in the message; and
     transmitting the message to other hypervisors in a same domain or a same datacenter as the first hypervisor.

2. The method of claim 1, further comprising:
in response to determining that the IP address has not been stored in the local DNS cache:
  transmitting the DNS query to a DNS server;
  determining whether a DNS reply to the DNS query has been received from the DNS server;
  in response to determining that the DNS reply to the DNS query has been received from the DNS server:
    parsing the DNS reply and extracting the IP address from the DNS reply; and
    storing the IP address in association with the domain name in the local DNS cache;
    providing the IP address to the virtual machine.

3. The method of claim 2, further comprising:
in response to determining that the DNS reply to the DNS query has been received from the DNS server and the IP address has been stored in the local DNS cache:
  determining whether an association between the domain name and the IP address has been stored in the local DNS cache; and
  in response to determining that the association between the domain name and the IP address has not been stored in the local DNS cache, storing the association between the domain name and the IP address in the local DNS cache; and
  wherein the association between the domain name and the IP address is stored in response to one or more of: receiving the DNS reply, receiving the association from another hypervisor, or receiving the association from a controller.

4. The method of claim 1, further comprising:
intercepting, by a DNS request interceptor, the DNS query; and
upon intercepting the DNS query, the DNS request interceptor performing the following operations:
  determining whether an association between the domain name and the IP address has been stored in the local DNS cache;
  in response to determining that the association between the domain name and the IP address has been stored in the local DNS cache:
    generating one or more update messages and including the association between the domain name and the IP address in each of the one or more update messages; and
    transmitting the one or more update messages to one or more second hypervisors.

5. The method of claim 1, further comprising:
determining whether an association between the domain name and the IP address has been stored in the local DNS cache;
in response to determining that the association between the domain name and the IP address has been stored in the local DNS cache:
  generating an update message and including, in the update message, the association between the domain name and the IP address; and
  transmitting the update message to a DNS cache synchronization controller to cause the DNS cache synchronization controller to distribute the update message to one or more second hypervisors.

6. The method of claim 1, further comprising:
receiving, by the first hypervisor, a second message comprising an association between a second domain name and a second IP address; and
storing the association between the second domain name and the second IP address in the local DNS cache.

7. The method of claim 1, further comprising:
receiving, by the first hypervisor that implements the local DNS cache, a second DNS query from a second virtual machine;
wherein the DNS query comprises the domain name;
wherein the first hypervisor, the local DNS cache and the second virtual machine are implemented on the first host;
determining whether the IP address for the domain name has been stored in the local DNS cache;
in response to determining that the IP address for the domain name has been stored in the local DNS cache:
  retrieving the IP address from the local DNS cache; and
  providing the IP address to the second virtual machine.

8. One or more non-transitory computer-readable storage media storing one or more computer instructions which, when executed by one or more processors, cause the one or more processors to perform:
receiving, by a first hypervisor that implements a local DNS cache, a DNS query from a virtual machine;
wherein the DNS query comprises a domain name;
wherein the first hypervisor, the local DNS cache and the virtual machine are implemented on a first host;
determining whether an Internet Protocol (IP) address for the domain name has been stored in the local DNS cache;
in response to determining that the IP address for the domain name has been stored in the local DNS cache, the first hypervisor performing:
  retrieving the IP address from the local DNS cache;
  providing the IP address to the virtual machine;
  generating a message and including an association between the domain name and the IP address in the message; and
  transmitting the message to other hypervisors in a same domain or a same datacenter as the first hypervisor.

9. The one or more non-transitory computer-readable storage media of claim 8, storing additional instructions which, when executed by the one or more processors, cause the one or more processors to perform:
in response to determining that the IP address has not been stored in the local DNS cache:
  transmitting the DNS query to a DNS server;
  determining whether a DNS reply to the DNS query has been received from the DNS server;
  in response to determining that the DNS reply to the DNS query has been received from the DNS server:
    parsing the DNS reply and extracting the IP address from the DNS reply; and
    storing the IP address in association with the domain name in the local DNS cache;
    providing the IP address to the virtual machine.

10. The one or more non-transitory computer-readable storage media of claim 9, storing additional instructions which, when executed by the one or more processors, cause the one or more processors to perform:
in response to determining that the DNS reply to the DNS query has been received from the DNS server and the IP address has been stored in the local DNS cache:
  determining whether an association between the domain name and the IP address has been stored in the local DNS cache; and
  in response to determining that the association between the domain name and the IP address has not been stored in the local DNS cache, storing the association between the domain name and the IP address in the local DNS cache; and wherein the association between the domain name and the IP address is stored in response to one or more of: receiving the DNS reply, receiving the association from another hypervisor, or receiving the association from a controller.

11. The one or more non-transitory computer-readable storage media of claim 8, storing additional instructions which, when executed by the one or more processors, cause the one or more processors to perform:
   determining whether an association between the domain name and the IP address has been stored in the local DNS cache;
   in response to determining that the association between the domain name and the IP address has been stored in the local DNS cache:
      generating one or more update messages and including the association between the domain name and the IP address in each of the one or more update messages; and
      transmitting the one or more update messages to one or more second hypervisors.

12. The one or more non-transitory computer-readable storage media of claim 8, storing additional instructions which, when executed by the one or more processors, cause the one or more processors to perform:
   determining whether an association between the domain name and the IP address has been stored in the local DNS cache;
   in response to determining that the association between the domain name and the IP address has been stored in the local DNS cache:
      generating an update message and including, in the update message, the association between the domain name and the IP address; and
      transmitting the update message to a DNS cache synchronization controller to cause the DNS cache synchronization controller to distribute the update message to one or more second hypervisors.

13. The one or more non-transitory computer-readable storage media of claim 8, storing additional instructions which, when executed by the one or more processors, cause the one or more processors to perform:
   determining whether an association between the domain name and the IP address has been stored in the local DNS cache;
   in response to determining that the association between the domain name and the IP address has been stored in the local DNS cache:
      determining whether a time value for the IP address has been provided;
      in response to determining that the time value for the IP address has been provided:
         setting a timer with the time value; and
         upon an expiration of the timer, deleting the IP address from the association; and
   wherein the association between the domain name and the IP address is stored in response to one or more of: receiving a DNS reply, receiving the association from another hypervisor, or receiving the association from a controller.

14. The one or more non-transitory computer-readable storage media of claim 8, storing additional instructions which, when executed by the one or more processors, cause the one or more processors to perform:
   receiving, by the first hypervisor that implements the local DNS cache, a second DNS query from a second virtual machine;
   wherein the DNS query comprises the domain name;
   wherein the first hypervisor, the local DNS cache and the second virtual machine are implemented on the first host;
   determining whether the IP address for the domain name has been stored in the local DNS cache;
   in response to determining that the IP address for the domain name has been stored in the local DNS cache:
      retrieving the IP address from the local DNS cache; and
      providing the IP address to the second virtual machine.

15. A hypervisor implemented in a host computer and configured to cache Domain Name System (DNS) related data and share the cached DNS related data with other hypervisors in a same domain or a same datacenter as the hypervisor, the hypervisor comprising:
   one or more processors;
   one or more memory units; and
   one or more non-transitory computer-readable storage media storing one or more computer instructions which, when executed by the one or more processors, cause the one or more processors to perform:
   receiving, by a hypervisor that implements a local DNS cache, a DNS query from a virtual machine;
   wherein the DNS query comprises a domain name;
   wherein the hypervisor, the local DNS cache and the virtual machine are implemented on a first host;
   determining whether an Internet Protocol (IP) address for the domain name has been stored in the local DNS cache;
   in response to determining that the IP address for the domain name has been stored in the local DNS cache, the hypervisor performing:
      retrieving the IP address from the local DNS cache;
      providing the IP address to the virtual machine;
      generating a message and including an association between the domain name and the IP address in the message; and
      transmitting the message to the other hypervisors in the same domain or the same datacenter as the hypervisor.

16. The hypervisor of claim 15, wherein the one or more non-transitory computer-readable storage media store additional instructions which, when executed by the one or more processors, cause the one or more processors to perform:
   in response to determining that the IP address has not been stored in the local DNS cache:
      transmitting the DNS query to a DNS server;
      determining whether a DNS reply to the DNS query has been received from the DNS server;
      in response to determining that the DNS reply to the DNS query has been received from the DNS server:
         parsing the DNS reply and extracting the IP address from the DNS reply; and
         storing the IP address in association with the domain name in the local DNS cache;
         providing the IP address to the virtual machine.

17. The hypervisor of claim 16, wherein the one or more non-transitory computer-readable storage media store additional instructions which, when executed by the one or more processors, cause the one or more processors to perform:
   in response to determining that the DNS reply to the DNS query has been received from the DNS server and the IP address has been stored in the local DNS cache:
      determining whether an association between the domain name and the IP address has been stored in the local DNS cache; and in response to determining that the association between the domain name and the IP address has not been stored in the local DNS cache, storing the association between the domain name and the IP address in the local DNS cache; and wherein the association between the domain name and the IP address is stored in response to one or more of: receiving the DNS reply, receiving the association from another hypervisor, or receiving the association from a controller.

18. The hypervisor of claim 15, wherein the one or more non-transitory computer-readable storage media store additional instructions which, when executed by the one or more processors, cause the one or more processors to perform:

determining whether an association between the domain name and the IP address has been stored in the local DNS cache;

in response to determining that the association between the domain name and the IP address has been stored in the local DNS cache:
  generating one or more update messages and including the association between the domain name and the IP address in each of the one or more update messages; and
  transmitting the one or more update messages to one or more second hypervisors.

19. The hypervisor of claim 15, wherein the one or more non-transitory computer-readable storage media store additional instructions which, when executed by the one or more processors, cause the one or more processors to perform:

determining whether an association between the domain name and the IP address has been stored in the local DNS cache;

in response to determining that the association between the domain name and the IP address has been stored in the local DNS cache:
  determining whether a time value for the IP address has been provided;
  in response to determining that the time value for the IP address has been provided:
    setting a timer with the time value; and
    upon an expiration of the timer, deleting the IP address from the association; and wherein the association between the domain name and the IP address is stored in response to one or more of: receiving a DNS reply, receiving the association from another hypervisor, or receiving the association from a controller.

20. The hypervisor of claim 15, wherein the one or more non-transitory computer-readable storage media store additional instructions which, when executed by the one or more processors, cause the one or more processors to perform:

receiving, by the hypervisor that implements the local DNS cache, a second DNS query from a second virtual machine;

wherein the DNS query comprises the domain name;

wherein the hypervisor, the local DNS cache and the second virtual machine are implemented on the first host;

determining whether the IP address for the domain name has been stored in the local DNS cache;

in response to determining that the IP address for the domain name has been stored in the local DNS cache:
  retrieving the IP address from the local DNS cache; and
  providing the IP address to the second virtual machine.

\* \* \* \* \*